United States Patent [19]

Bartholomäus

[11] 4,194,394

[45] Mar. 25, 1980

[54] FLOW METER

[75] Inventor: Reiner Bartholomaus, Neuendorf, Fed. Rep. of Germany

[73] Assignee: G. L. Rexroth GmbH, Lohr, Fed. Rep. of Germany

[21] Appl. No.: 905,869

[22] Filed: May 15, 1978

[30] Foreign Application Priority Data

May 17, 1977 [DE] Fed. Rep. of Germany ....... 2722239

[51] Int. Cl.² .............................................. G01F 1/28
[52] U.S. Cl. .................................................... 73/207
[58] Field of Search .................................. 73/207, 208

[56] References Cited

U.S. PATENT DOCUMENTS

| 1,068,926 | 7/1913 | Popoff | 73/208 |
|---|---|---|---|
| 1,200,640 | 10/1916 | Morris | 73/208 |
| 1,641,744 | 9/1927 | Decker | 73/208 |
| 2,052,022 | 8/1936 | Fisher | 73/208 |
| 2,640,356 | 6/1953 | Shannon | 73/208 |
| 2,889,780 | 6/1959 | Binford | 73/207 X |
| 2,934,094 | 4/1960 | Szydlowski | 73/207 X |

*Primary Examiner*—Herbert Goldstein
*Attorney, Agent, or Firm*—Michael J. Striker

[57] ABSTRACT

A flow meter comprises a housing defining a fluid inlet passage and a fluid outlet passage; a piston defining a jacket surface and a base surface is arranged in the housing for reciprocating movement between the two passages; a biasing spring urges the piston into a zero flow position in which the piston interrupts the communication between the two passages; the base surface of the piston faces the inlet passage so that the fluid flow displaces the piston into a flow position; flow distributing means in the form of a partition arranged in the outlet passage has a plurality of slots shaped for adjusting the flow rate between the two passages according to the variation of the spring bias of the moving piston; and an electrical position detector coupled to the piston to generate an electrical signal proportional to the displacement of the piston.

10 Claims, 4 Drawing Figures

FLOW METER

BACKGROUND OF THE INVENTION

This invention relates generally to flow meters, and more specifically it relates to a flow meter of the type where the pressure of inlet fluid impinges in an opening direction against a movable member, the position of which relative to a fixed point indicates the rate of flow.

Conventional flow meters of this type consist of a conical tube in which a suspended body is arranged for free movement. The conical tube has to be installed perpendicularly whereby the instant position of the suspended body is a measure of the rate of flow of the fluid. The conical tube is made of a transparent material and is provided with a scale for reading the vertical position of the suspended body.

SUMMARY OF THE INVENTION

An object of this invention is to provide a flow meter that can be installed in hydraulic devices in any desired position.

Another object of this invention is to provide a flow meter that can be easily combined with and adjusted to different hydraulic devices.

Still another object of this invention is to provide a flow meter that can be readily calibrated.

In keeping with these objects, and others which will become apparent hereafter, one feature of the invention resides, in a flow meter having a suspended body impinged by the incoming fluid, in a combination which comprises a housing defining a fluid inlet passage and a fluid outlet passage, a piston arranged in the housing for reciprocating movement between the two passages, the piston defining a jacket surface and a base surface; a spring biasing the piston into a zero flow position in which the base surface closes the inlet passage and the jacket surface closes the outlet passage, and into a flow position in which the control edge between the base surface and the jacket surface opens the outlet passage; a partition having a plurality of slots arranged in or insertable into the outlet passage to regulate the communication between the two passages in response to the position of the piston; and an electrical position detector coupled to the piston to generate an electric signal proportional to the displacement of the piston.

The flow controlling partition can be movably arranged within the housing in connection with the piston or it can be fixedly arranged in the outlet passage to cooperate with the jacket surface of the piston.

In another modification, the piston can be profiled to define a boss cooperating with the inlet passage, and at least one annular recess between the base and the boss of the piston, the recess providing a communication between the inlet passage and the outlet passage. In this modification, counteracting tension springs urge the piston in the zero flow position in which the boss is in alignment with a control slot communicating with the inlet passage.

The novel features which are considered as characteristic for the invention are set forth in particular in the appended claims. The invention itself, however, both as to its instruction and its method of operation, together with additional objects and advantages thereof, will be best understood from the following description of specific embodiments rendered in connection with the accompanying drawing.

DESCRIPTION OF THE PREFERRED EMBODIMENTS

Figure 1:
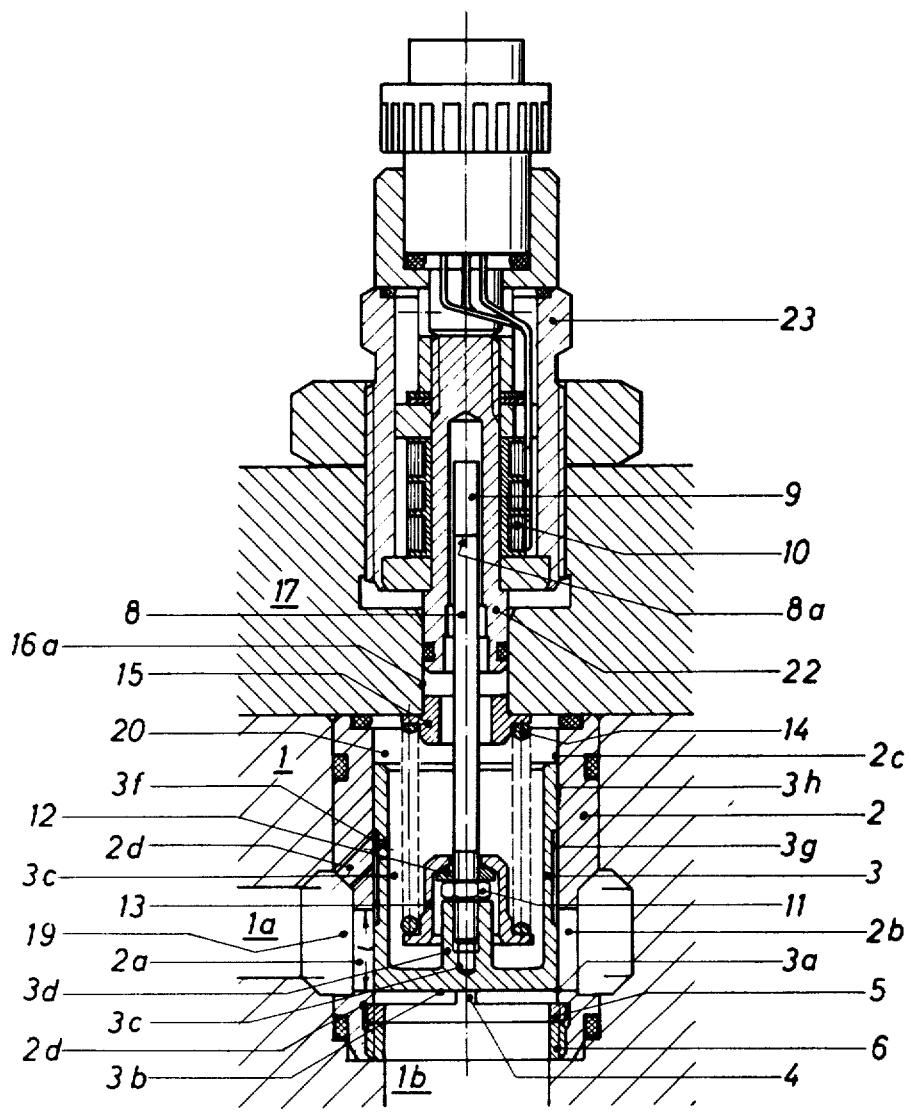
FIG. 1 is a sectional view of an embodiment of the flow meter of this invention having fixedly arranged flow control slots.

Referring firstly to FIG. 1, a receptacle housing 1 defines a fluid outlet passage 1a and, arranged at right angles thereto, a fluid inlet passage 1b. Arranged in alignment with the inlet passage 1b is a bore hole in which sleeve 2 is inserted. In the region of the outlet passage 1a the sleeve 2 has two juxtaposed control slots 2a and 2b the combined widths of which are smaller or equal to half the circumference of a piston 3 that is arranged for reciprocating movement in the sleeve 2. In this manner the ratio of the piston circumference to the total width of the control slots is equal or larger than 2.

Piston 3 defines a base surface 3b and a jacket surface that in the initial zero flow condition covers the outlet passage 1a. The edge 3a of the base surface 3b determines during the movement of the piston the effective opening of the slots 2a and 2b and therefore the displacement of the piston 3 controls also the rate of flow between the inlet passage 1b and the outlet passage 1a. As shown in FIG. 1 piston 3 is urged by means of a pressure spring 14 into the zero-flow position in which the jacket surface of the piston fully closes the control slots 2a and 2b of the outlet passage 1a and in which the base surface 3b abuts against projections 4 of a stop ring 5. Ring 5 is held in position in the lower portion of the sleeve 2 by means of a collet 6 having an exterior thread in engagement with a corresponding interior thread in the sleeve 2 to urge the ring 5 against a stop flange 2d in the sleeve 2. Piston 3 on its other end has a cylindrical recess 3c the bottom of which has a hub-like projection 3d with a threaded boring 3e for receiving an end portion of a rod 8. The free end 8a of the rod 8 supports an iron core 9 cooperating with a coil 10 as it will be explained below, to form an inductive pick-up or detector of the movement or position of the piston 3. The threaded portion of rod 8 is secured in the projection 3d by means of a lock nut 11 and above the lock nut is provided a spherical supporting member 12 that supports a cap-shaped spring washer 13 upon which one end of spring 14 is seated. The other end of the tension spring 14 rests on a supporting member 15 that is inserted into a boring 16a in a cover plate 17 covering the receptacle housing 1. Due to the spherical shape of the supporting surface for the spring washer 13 any misalignment of the pressure spring 14 can be minimized and consequently the hysteresis effect of the spring can also be held at minimum. The cylindrical recess 3c of the piston 3 communicates via a radial boring 3f with an annular groove 3g provided in the jacket surface 3h of the piston. The annular groove 3g is, via an oblique boring 2d' through the insert sleeve 2, in communication with an annular space 19 in the range of the control slots 2a and 2b and with the outlet passage 1a in the receptacle housing 1. Consequently, the cylindrical recess 3c of piston 3 as well as the guiding space 20 for the piston 3 is under the influence of the outlet fluid pressure passing through the passages 1b and 1a. In this manner the piston 3 in addition to the force of the pressure spring 14 is also acted upon in the closing direction by the pressure of the fluid.

The guide space 20 for the piston 3 is closed from the outside by cover plate 17 and cap 22 passing through the boring 16a in the cover plate. The cap 22 acts at the same time as a support for coil 10 and its hollow interior accommodates the end of the rod 8 together with the iron core 9 that is movable within the range of coil 10. A threaded collar 23 holds the cap 22 in position in the cover plate 17 and the whole assembly forms an electrical pick-up unit for detecting the movement of the piston. The pressure spring 14 has preferably such a characteristic line that the square root of the ratio of fluid pressure against piston 3 when the latter is in its uppermost position rendering the outlet passage 1a fully open, to the fluid pressure in the low position of the piston when the edge 3a has just permitted the flow, is equal or smaller than 1,2. Moreover, the ratio of the base surface 3b of the piston 3 that is acted upon by the flowing fluid to the maximum combined opening area of both control slots is larger or equal to 2,3. If these two conditions as well as the previously mentioned condition according to which the ratio of the piston circumference to the total width of the control slits is equal or larger than 2 are fulfilled, the width of the control slots over their entire length can be held constant without necessity of modifying the measured values in the flow rate of the fluid. In the case when the aforementioned conditions are not fulfilled, the width of the control slots, viewed in the opening direction of movement of the piston, has to be gradually reduced in response to the changing pressure difference between the inlet fluid pressure and the outlet fluid pressure and also in response to the increasing force of spring 14 when the piston is being displaced into its opening position. The accurate width variation of each control slot can be computed from the following equation:

$$b = \frac{u \cdot D \cdot (f_1 + 0.5 \cdot x)}{\alpha \cdot (f_1 + x)^{1.5}} \cdot \sqrt{\frac{\rho \cdot \pi}{2 \cdot c}}$$

wherein:
b = the width of a control slot [cm]
x = the effective length of the slot measured from the base edge of the piston
$f_1$ = the bias of the pressure spring [cm]
c = spring constant [Kp/cm]
$\rho$ = the density [Kg/dm³]
$\alpha$ = the rate of contraction or throughflow
D = the diameter of the piston [cm]

$$u = tg\alpha = \frac{Q_{xmax}}{x_{max}} \left[ \frac{1}{min} \cdot \frac{1}{cm} \right] = \text{the desired linear}$$

variation of the throughflow through a length of the control slot.

Any opening position of the piston 3 is transferred via the rod 8 to the iron core 9 and the position of the core 9 causes a corresponding change in the inductivity of the coil 10 resulting in an electrical signal that is applied to an electrical indicator for indicating the amount of flow whereby the electrical signal is in a linear proportion to the movement of the piston in the opening or closing direction.

Figure 2:
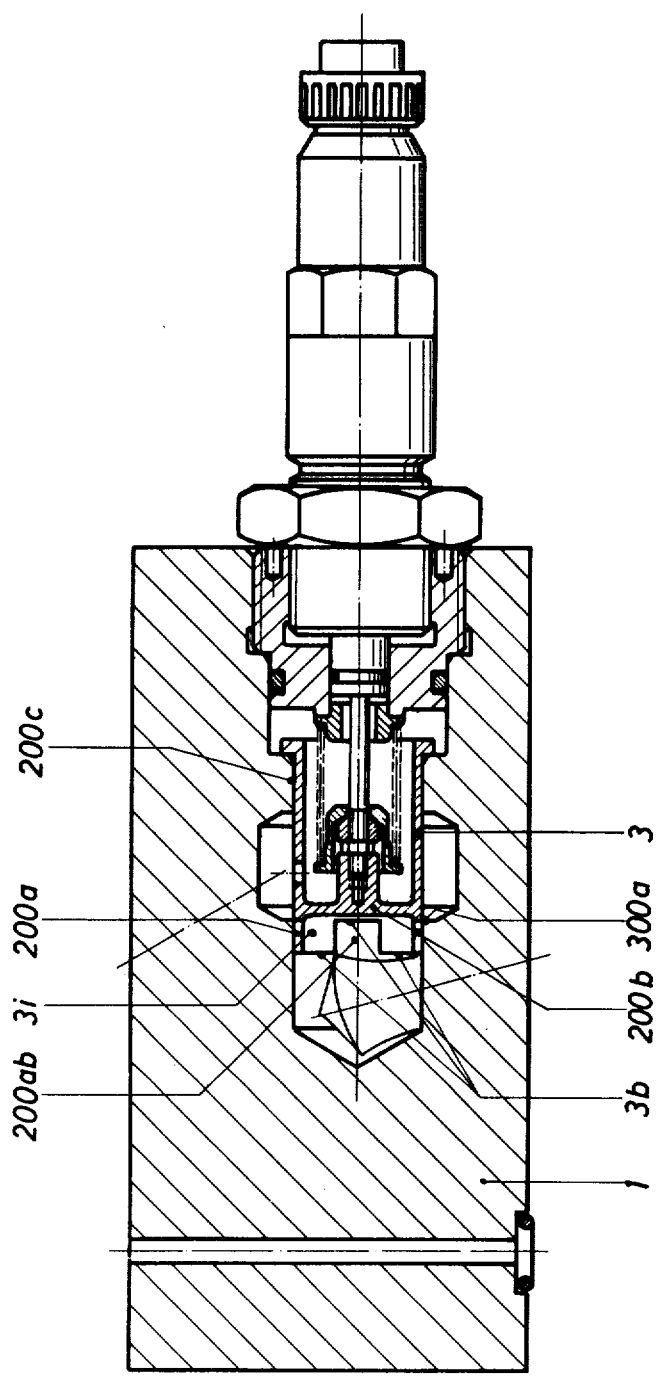
FIG. 2 is a sectional view of another embodiment of the flow meter of this invention having movably arranged flow control slots.

The embodiment as shown in FIG. 2 differs from the embodiment according to FIG. 1 only in the different arrangement of the control slots 200a and 200b and an additional control slot 200ab, arranged opposite to another slot (not shown in the drawing). The slots are provided in a cylindrical sleeve 3i that projects from the base of the piston 3. In this modification, the control edge 300a is formed by an edge of the outlet passage in housing 1. A guide boring 200c is also provided in the housing 1 for guiding the piston 3 so that an additional sleeve insertable into the housing 1 is no longer necessary.

Figure 3:
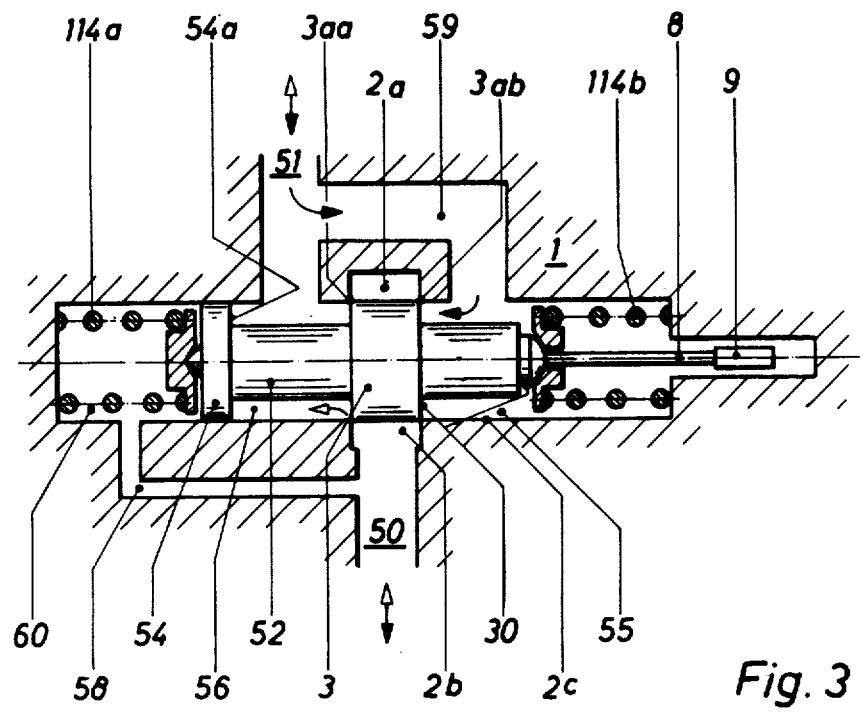
FIG. 3 is a sectional view of still another embodiment of the flow meter of this invention adapted for operation in either direction of flow.

In the embodiment shown in FIG. 3 piston 3 has an embossed intermediate part defining two control edges 3aa and 3ab spaced apart about the distance of control slots 2a and 2b provided in the housing 1. In a zero flow position, the jacket surface of the embossed part of the piston 3 is held in alignment with the control slots 2a and 2b by means of two counteracting springs 114a and 114b. By this arrangement the possibility arises that the flow meter according to FIG. 3 is applicable for operation in either direction of flow of the measured fluid. Of course, to measure the fluid flow in both directions requires also a corresponding modification of the inductive movement detector 9 and 10. In the position shown in FIG. 3 the iron core 9 is situated approximately in the middle of the coil 10 and this position corresponds to the zero flow. In displacing the core 9 in one direction, a position signal is generated whereas the movement in opposite direction generates a negative electrical signal. Consequently the sign of the electrical signal makes it possible to determine the direction of flow. For example, if the fluid flows through the flow meter from passage 50 in the direction to passage 51, a base surface 54 of piston 3 is acted upon by the incoming fluid via a bypass channel 58 and moves in the direction of spring 114b. Due to the resulting movement of the piston 3 against the force of spring 114b, the jacket surface of the embossed central part of the piston 3 is displaced into the pressure space 55. As a result, the control edge 3aa opens the control slots 2a and 2d whereby the resulting cross section of the open area corresponds to the rate of flow of the fluid. The fluid also flows through the space 56 between the embossed central part of the piston and the base part 54 into the outlet passage 51. The outgoing fluid in the outlet passage 51 enters via a bypass channel 59 the pressure space 55 and acts against the base surface of the embossed central part of the piston 3 and this pressure is added to the pressure of the spring 114b in the closing direction of movement of the piston. When the direction of flow is changed and the fluid streams through the flow meter from the passage 51 in the direction to the passage 50, the fluid enters via the bypass channel 59 the pressure space 55, impinges against the base surface of the embossed central part of the piston and moves the piston against the force of pressure spring 114a in the direction of pressure space 60 whereby the displacement corresponds to the rate of fluid flow. The control edge 3ab of the embossed central part uncovers a proportionally large free opening in the control slots 2a and 2b. The outgoing fluid in the passage 50 enters via a bypass channel 58 the pressure space 60 and impinges against the base surface of the end section 54 of the piston 3 and contributes to the pressure of spring 114a in the closing direction. The incoming fluid or alternatively the outcoming fluid applied into the interspace 56 between the embossed section of the piston has no effect upon the movement of the piston because the annular end surfaces 54a and 30 are equal and therefore no net force occurs in the direction of pressure space 65. The embodiment as illustrated in FIG. 3 can be modified according to FIG. 2 inasmuch as the piston 3 can be provided with a cylindrical sleeve having corresponding control slots whereby the control edges 2c in the guide space 55 can cooperate with the cylindrical attachment sleeve to control the size of effective openings through the control slots.

Figure 4:
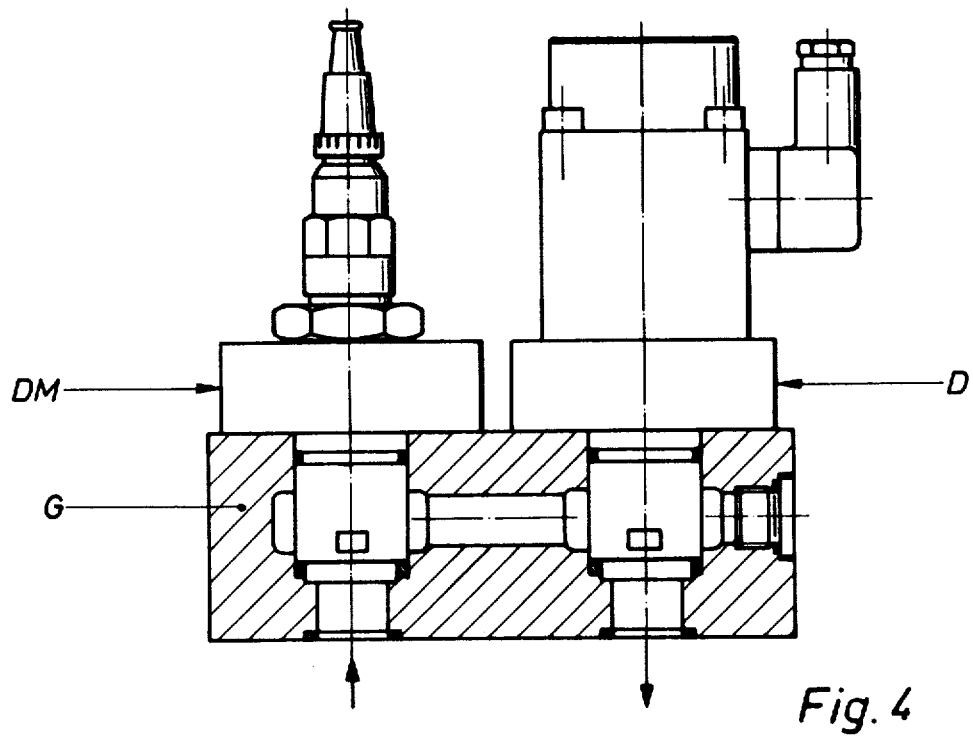
FIG. 4 is a side view partly in section of a combination of the flow meter of this invention with an electrically adjustable pressure regulating valve.

In FIG. 4, DM indicates a flow meter according to this invention whereby a throttle or pressure control valve D is arranged in common housing G in operative connection with the flow meter DM. The throttle D is controlled by an electromagnet (not shown) that in turn is controlled by the signal from the position detector of the flow meter of this invention. A nominal value signal adjusts the throttle D to a position corresponding to a predetermined pressure difference. The actual signal received from the flow meter DM is compared to the nominal signal for the control electromagnet of the throttle D and the resulting difference signal is employed as a control signal for the control electromagnet of the throttle D. In this manner, a simple electrically controllable fluid stream regulator is created which by virtue of avoiding the current balance of conventional throttle regulators achieves an increased control speed as well as a higher accuracy.

It will be understood that each of the elements described above, or two or more together, may also find a useful application in other types of constructions of flow meters differing from the types described above.

While the invention has been illustrated and described as embodied in a flow meter for use with induction type displacement detector, it is not intended to be limited to the details shown, since various modifications and structural changes may be made without departing in any way from the spirit of the present invention.

What is claimed as new and desired to be protected by Letters Patent is set forth in the appended claims:

1. In a flow meter, a combination comprising: a housing defining a fluid inlet passage and a fluid outlet passage; a piston arranged in said housing for reciprocating movement between said passages, said piston defining a jacket surface, a base surface and a control edge between the two surfaces, said control edge and said jacket surface being arranged for controlling the opening of said passages during the movement of the piston; spring means biasing said piston into a zero flow position in which the piston closes the communication between said passages; flow distributing means arranged between the passages for adjusting the flow rate of the fluid in response to the movement of said piston, and including a sleeve attached to said piston and projecting into said fluid inlet passage, said sleeve being provided with a plurality of slots for passing the fluid from said inlet passage into said outlet passage; and an electrical position detector coupled with the piston to generate an electrical signal proportional to the displacement of the piston.

2. A combination as defined in claim 1 wherein the width of each slot viewed in the opening direction of movement of said piston is inversely proportional to the spring bias of said piston.

3. In a flow meter, a combination comprising: a housing defining a fluid inlet passage and a fluid outlet passage; a piston arranged in said housing for reciprocating movement between said passages, said piston defining a jacket surface, a base surface and a control edge between the two surfaces, said control edge and said jacket surface being arranged for controlling the opening of said passages during the movement of the piston; spring means biasing said piston into a zero flow position in which the piston closes the communication between said passages; and flow distributing means arranged between the passages for adjusting the flow rate of the fluid in response to the movement of said piston, and including a partition inserted into said housing between said outlet passage and said piston and defining a plurality of slots cooperating with a control edge of said piston to adjust the communication between said inlet and outlet passages, the variation of the width of each slot corresponding to the following conditions:

(a) the ratio of the piston circumference to the width of a control slot is larger or equal to 2;
(b) the ratio of the base surface of the piston acted upon by the inlet pressure fluid to the maximum open cross section of the combined control slots is larger or equal to 2,3;
(c) the spring constant of the spring urging the piston in closing direction has such a value that the square root of the ratio of the fluid inlet pressure at the maximum open position of the piston of the inlet fluid pressure at the minimum open position of the piston is equal or smaller than 1, 2; and an electrical position detector coupled with the piston to generate an electrical signal proportional to the displacement of the piston.

4. In a flow meter, a combination comprising: a housing defining a fluid inlet passage and a fluid outlet passage; a piston arranged in said housing for reciprocating movement between said passages, said piston defining a jacket surface, a base surface and a control edge between the two surfaces, said control edge and said jacket surface being arranged for controlling the opening of said passages during the movement of the piston; spring means biasing said piston into a zero flow position in which the piston closes the communication between said passages; a universal joint member for coupling said spring means to said piston; flow distributing means arranged between the passages for adjusting the flow rate of the fluid in response to the movement of said piston; and an elecrrical position detector with the piston to generate an electrical signal proportional to the displacement of the piston.

5. The combination as defined in claim 4 wherein said spring means includes a spring supported on a spring rest coupled to the piston by said universal joint.

6. A combination as defined in claim 4 wherein said piston has a cylindrical recess, and means disposed in said recess for supporting a coupling member for said electrical position detector.

7. A combination as defined in claim 6 wherein the position detector is in the form of an electrical signal generator including an induction coil and a movable core secured to the free end of said coupling member.

8. A combination as defined in claim 4 wherein said housing further includes an electromagnetically controlled pressure control valve for controlling the fluid pressure in said inlet passage, the electromagnet of said pressure control valve being energized by a nominal value signal corresponding to a predetermined pressure difference in the valve and the output signal from said position detector being applied to the electromagnet of said valve to produce a difference signal for controlling the operation of said electromagnet.

9. In a flow meter, a combination comprising
a housing defining fluid inlet and fluid outlet passages arranged in said housing opposite each other, said housing further defining a boring traversing said inlet and outlet passage and two opposite control slots communicating with said boring;
a piston arranged in said housing for reciprocating movement between said passages, said piston defining a jacket surface, a base surface and a control edge between the two surfaces, said control edge and said jacket surface being arranged for controlling the opening of said passages during the movement of the piston, the latter having an embossed central part closing said control slots; in a zero flow position of the piston;
spring means including two springs acting in opposite directions on said piston so as to hold the latter in said zero flow position in which said piston closes the communication between said passages; flow distributing means arranged between the passages for adjusting the flow rate of the fluid in response to the movement of said piston; and an electrical position detector coupled with the piston to generate an electrical signal proportional to the displacement of the piston.

10. A combination as defined in claim 9 wherein a sleeve is attached to said piston, said sleeve having a plurality of control slots cooperating with a control edge defined between said boring and said inlet and outlet passages.

* * * * *